United States Patent [19]

Barhorst

[11] 4,180,720
[45] Dec. 25, 1979

[54] WELDING POWER SUPPLY

[75] Inventor: Ralph E. Barhorst, Troy, Ohio

[73] Assignee: Hobart Brothers Company, Troy, Ohio

[21] Appl. No.: 915,813

[22] Filed: Jun. 15, 1978

[51] Int. Cl.$^2$ ............................................. B23K 9/10
[52] U.S. Cl. .................................................. 219/130.51
[58] Field of Search ............... 219/137 PS, 130.51, 219/130.32, 130.4

[56] References Cited

U.S. PATENT DOCUMENTS

| | | | |
|---|---|---|---|
| 3,068,352 | 12/1962 | Correy | 219/130.51 |
| 3,300,683 | 1/1967 | Weishaar | 219/137 PS |
| 3,330,933 | 7/1967 | Maklary | 219/130.51 |
| 3,382,345 | 5/1968 | Normando | 219/130.4 |
| 3,598,954 | 8/1971 | Iceland et al. | 219/130.51 |
| 3,781,508 | 12/1973 | Dauer et al. | 219/130.51 |
| 3,894,210 | 7/1975 | Smith et al. | 219/137 PS |
| 3,999,034 | 12/1976 | Barhorst | 219/130.32 |
| 4,092,517 | 5/1978 | Woodacre | 219/137 PS |

Primary Examiner—Elliot A. Goldberg
Assistant Examiner—Clifford C. Shaw
Attorney, Agent, or Firm—Biebel, French & Nauman

[57] ABSTRACT

A square wave welding power supply system includes two constant current power sources. The first power source 10 is preferably an SCR controlled power supply having an output connected in an arc circuit 15 through an inverter circuit including SCR-1 through SCR-4 which controls the polarity and duration of the welding current applied to the arc circuit. The second power supply 20 is preferably a reactor power supply for supplying additional welding current during one polarity of the square wave. A shorting means (SCR-5) is connected across the output of the second power supply to maintain current flow therefrom during those intervals when the output of power supply 20 is not connected to the arc circuit. A gating circuit 30 controls the SCRs (SCR-1 through SCR-5) and commutation circuits (C-1 through C-5) connected across each SCR. A diode D1, or SCR, is connected in series with the second power supply output to prevent short circuiting of the arc by SCR-5.

4 Claims, 3 Drawing Figures

WELDING POWER SUPPLY

BACKGROUND OF THE INVENTION

This invention relates to a welding power supply system which may be used for shielded metal arc welding, plasma arc welding, and inert gas arc welding, and has particular application to inert gas arc welding using nonconsumable electrodes, such as tungsten, commonly referred to as a tungsten inert gas (TIG) welding used in the welding of aluminum, aluminum alloys and similar metals.

Square wave welding power supplies are described in various prior art patents including U.S. Pat. Nos. 3,068,352; 3,330,933; 3,382,345; 3,300,683; 3,598,954 and 3,999,034.

Many of the prior art welding power supplies include two reactor controlled power sources to provide welding current of opposite polarities to an arc circuit. If high arc voltages are required, then additional power sources must be connected in parallel, and the result is four power supplies, the total weight of which can be as much as 5,000 pounds. Another disadvantage when using reactor controlled power sources is that one or the other of the power sources is short circuited during the period when it is not connected to the arc to allow that power source to be under constant regulation, an obviously inefficient arrangement.

SUMMARY OF THE INVENTION

This invention relates specifically to a welding power supply system for supplying square wave welding current to an arc circuit which employs two power sources, one of which is connected to the arc circuit continuously through a switching circuit controlling the polarity and duration of the voltage to the arc circuit. A second, substantially constant current power source is connected to the arc circuit during one polarity of the square wave applied to the arc circuit.

The bulk of the welding current for both straight and reverse polarity is provided by the controlled current power source which in a preferred embodiment of the invention is an SCR (Silicon Controlled Rectifier) welder. An SCR power source is preferred because of the small size and weight as compared to a reactor power source of the same output.

An SCR welder includes a power transformer having its primary windings connected to a three phase source of AC power, and its secondary windings connected through a plurality of SCRs to the output terminals. A current transducer senses the output current level, and this provides a feedback signal to a control circuit which then adjusts the firing angle of the SCRs so that a substantially constant current output is activated.

An SCR welder is inherently a constant voltage device, but in combination with a feedback circuit it may be used to produce a substantially constant current output curve. Because of the control circuit reaction time, a device of this type cannot be made to change current or voltage levels quickly, and therefore it would not be suitable for those circuits where the characteristic impedance of the load presented to the power source is changed suddenly. On the other hand, since this power source is continuously connected to the arc, control problems are minimal. It is true, however, that the reverse polarity voltage of the arc circuit is slightly higher than the straight polarity voltage, and therefore there is a slight impedance change as the output is switched, but this is easily smoothed by a filter reactor in the output of the power supply.

Additional current is supplied to the arc circuit preferably during the reverse polarity portion of the cycle, and this may be provided by a constant current power source. A reactor controlled welder is particularly suited to this environment, however, a resistance limited power supply may also be used. The lower current requirements from this power source permit it to be small and compact.

A power supply system constructed according to this invention can therefore be made smaller, lighter, less expensive and will be more efficient than prior art power supplies designed to accomplish the same purpose.

These and other objects and advantages of the invention will be apparent from the following description, the accompanying drawings and the appended claims.

DESCRIPTION OF THE PREFERRED EMBODIMENT

Figure 1:
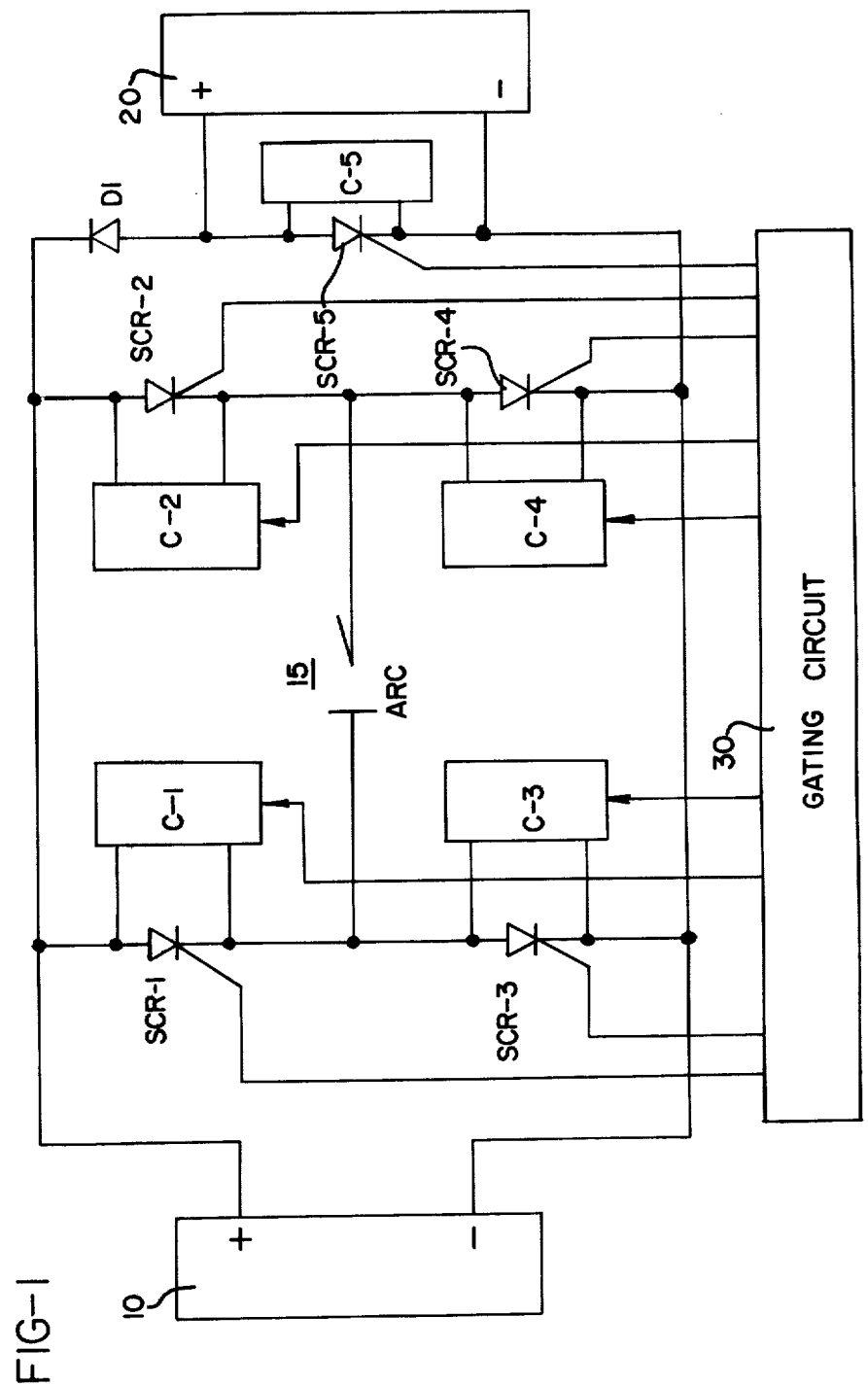
FIG. 1 is an electrical block diagram showing the components comprising the present invention.

Referring now to the electrical block diagram of FIG. 1, the welding power supply system of this invention includes a first, controlled, direct current power source 10 connected to an arc circuit 15 through switching circuit means including gate controlled thyristors or silicon controlled rectifiers SCR-1, SCR-2, SCR-3 and SCR-4. By proper application of control signals to SCR-1 through SCR-4, the polarity and duration of the welding current to the arc circuit is controlled.

A second direct current power supply 20 is also connected to the arc circuit through the switching circuit means. Shorting means in the form of an SCR-5 is connected across the output of the power supply 20 to control the application of the additional current from that power supply to the welding circuit. Diode D1 is provided in the output of the power supply 20 to isolate shorting SCR-5 from the remainder of the circuit. Commutating circuit means C-1 through C-5 are connected across SCR-1 through SCR-5 to commutate their respective SCRs off at a time determined by gating circuit 30.

Gating circuit 30 controls when each of the gate controlled thyristors or SCR is gated on, by application of trigger pulses to their gate electrodes, and when each SCR is turned off, by means of the commutation circuits C-1 through C-5. The gating circuit and the commutation circuits are more fully described in U.S. Pat. No. 3,999,034.

The bulk of the welding current for both straight and reverse polarity welding is provided by the adjustable, constant current, direct current power source 10. During straight polarity welding (electrode negative), SCR-1 and SCR-4 are conducting, and SCR-2 and SCR-3 are placed in the nonconducting state. During reverse polarity welding (electrode positive), SCR-2 and SCR-3 are conducting and SCR-1 and SCR-4 are not conducting. The magnitude of the current for both straight and reverse polarity would therefore be identical if only the power source 10 were used.

The second power source 20 is also a constant current device and is preferably a reactor controlled power source, although a resistance limited power source may also be employed if extremely accurate curent regulation from this additional power supply is not required. In the preferred embodiment of this invention, the power source 20 has an adjustable output of from 5 to 99 amperes while the main power supply has an adjustable constant current output of from 3 to 299 amperes.

Figure 3:
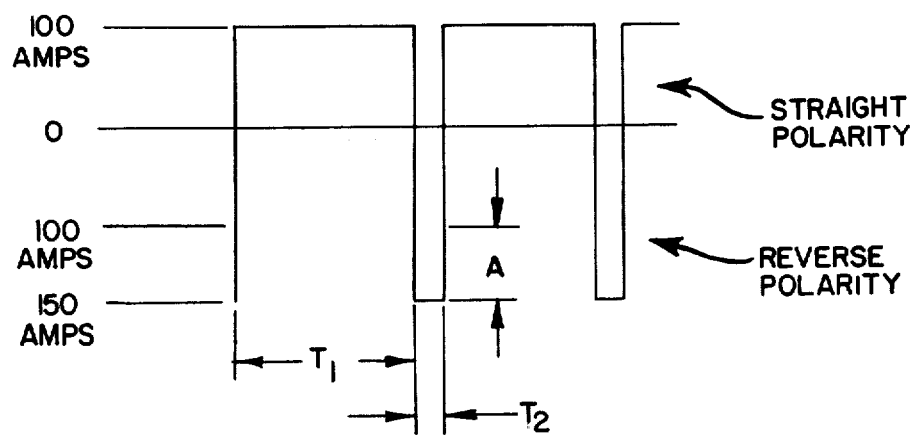
FIG. 3 is a waveform diagram of the current as applied to the arc circuit.

It has been found that when welding thin aluminum, improved results are obtained when the magnitude of the reverse polarity current is higher than the magnitude of the straight polarity current and when the straight polarity time is significantly longer than the reverse polarity time. This is illustrated in FIG. 3 where, by way of example, the straight polarity current from power source 10 is shown as 100 amperes and has a time duration T1 which is typically in the range of from 15 to 20 milliseconds. During the reverse polarity cycle, current from the power source 20 is added to the arc circuit, thus increasing the current by the amount "A", or to 150 amperes in this example. The reverse polarity current is applied for time T2, typically two to three milliseconds. In the present invention, times T1 and T2, the magnitude of the straight polarity current and the magnitude of the reverse polarity current are all adjustable.

During the straight polarity portion of the cycle, SCR-1, SCR-4 and SCR-5 are gated on. Because SCR-5 is on, no current from the power source 20 is made available to the arc circuit. During the reverse polarity portion of the cycle, SCR-2 and SCR-3 are gated on, and SCR-1, SCR-4 and SCR-5 are commutated off; and current from the power source 20 is then added to the arc circuit.

Of course, if it should ever be desired to have the magnitude of the straight polarity current greater than the reverse polarity current, then the gating signals to SCR-5 would be changed to coincide with the gating of SCR-2 and SCR-3.

Figure 2:
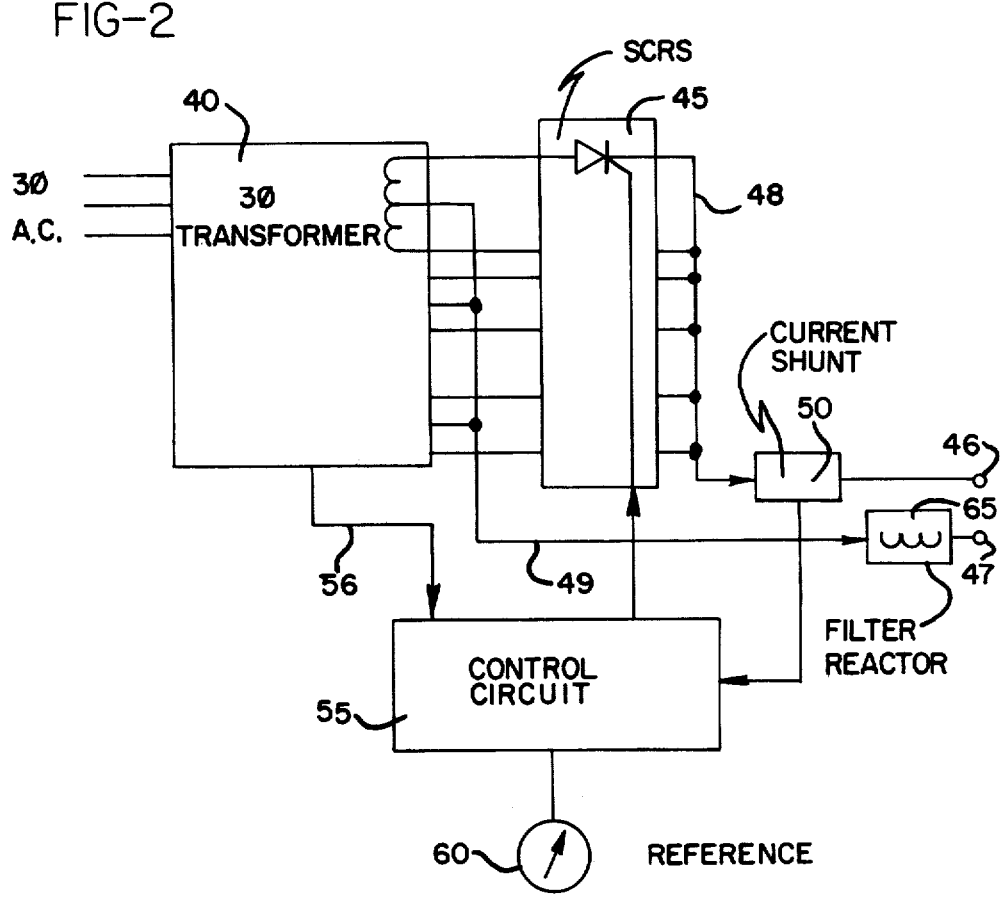
FIG. 2 is a block electrical diagram of a controlled current power source.

In the preferred embodiment, the power source 10 is an SCR welder, a block diagram of which is shown in FIG. 2. This SCR welder includes a three phase transformer 40 having its primary winding connected to a three phase source of alternating current, and its secondary windings connected through a rectifier circuit 45, which includes six gate controlled thyristors or silicon controlled rectifiers (SCR), to output terminals 46 and 47. The outputs of the SCRs are connected to line 48, while the center taps of the secondary windings are connected to line 49.

The output current of the power supply is sensed by a current shunt 50 which provides a feedback signal to a control circuit 55. The control circuit also receives synchronizing signals on line 56 from the transformer, and this control circuit then provides control signals to the gates of the rectifiers in circuit 45 to maintain the current flow through the transformer at a level set by the adjustable reference 60. A filter reactor 65 is connected to one of the output lines of the power supply to provide a smoothed output.

A power source of this type requires an essentially stable or constant impedance load in order for its output current to remain substantially constant because of the finite time required for the feedback system and the control circuit 55 to force a change in the SCR conducting time whenever there is a large change in the load. Accordingly, this type of power supply would not be usable as the power source 20, the output of which is shorted by an SCR for a portion of the time, and connected to the arc circuit for the remainder of the time. On the other hand, since the load presented by the arc circuit is substantially constant, once the arc has been established, during both the straight and reverse polarity portions of the cycle—the reverse polarity voltage being only slightly higher than the straight polarity voltage —and those small changes are easily smoothed by the filter reactor 65.

The power supply 20 is preferably a reactor welder which is inherently a constant current device, and its output current will be practically constant regardless of whether it is short circuited by SCR-5 or connected to the arc circuit 15. In those applications where good current regulation from the power source 20 is not needed, then a resistance limited power supply could be employed with the current level being established by the amount of resistance in the output circuit.

A reactor welder could also be used for the power source 10, but its size and weight would have to be much larger than the SCR power supply described for the same current output. On the other hand, since the power source 20 only provides approximately 100 amperes, its size and weight are not objectionably large.

Accordingly, a small size, light weight and highly efficient square wave welder has been described.

While the form of apparatus herein described constitutes a preferred embodiment of this invention, it is to be understood that the invention is not limited to this precise form of apparatus, and that changes may be made therein without departing from the scope of the invention which is defined in the appended claims.

What is claimed is:

1. A welding power supply system for supplying square wave welding current to an arc circuit comprising first power source having an adjustable controlled direct current output, switching circuit means connected between the output of said first power source and the arc circuit for controlling the polarity of the current applied thereto, control circuit means connected to said switching circuit means for controlling the polarity and duration of the current to said arc circuit, second power source having a substantially constant direct current output connected to said arc circuit, shorting means connected across the output of said second power source and being responsive to said control circuit means whereby the current from said second power source is added to the arc circuit only during one polarity of the square wave current applied thereto, and means for isolating the shorting means from the arc circuit while the output of said second power source is short circuited.

2. A welding power supply system for supplying square wave welding current to an arc circuit comprising a first three phase power source includes a transformer, rectifier and current control circuit including a plurality of gate controlled thyristors, a reference, a current sensor and circuit means responsive to said reference and said current sensor for providing gating signals to said gate controlled thyristor, switching circuit means connected between the output of said first power source and the arc circuit for controlling the polarity of the current applied thereto, control circuit means connected to said switching circuit means for controlling the polarity and duration of the current to said arc circuit, a second power source having a substantially constant direct current output connected to said arc circuit, shorting means connected across the output of said second power source and being responsive to said control circuit means whereby the current from said second power source is added to the arc circuit only during one polarity of the square wave current applied thereto, and means for isolating the shorting means from the arc circuit while the output of said second power source is short circuited.

3. The welding power system of claim 2 wherein said second power source has a reactor controlled output.

4. The welding power system of claim 2 wherein said second power source has a resistance controlled, current limited output.

* * * * *